US009483942B2

(12) United States Patent
O'Hara

(10) Patent No.: US 9,483,942 B2
(45) Date of Patent: Nov. 1, 2016

(54) TRANSPORTATION LOCATION AND ALERT APPLICATION FOR MOBILE DEVICE

(71) Applicant: Jeff O'Hara, New Orleans, LA (US)

(72) Inventor: Jeff O'Hara, New Orleans, LA (US)

( * ) Notice: Subject to any disclaimer, the term of this patent is extended or adjusted under 35 U.S.C. 154(b) by 0 days.

(21) Appl. No.: 14/963,694

(22) Filed: Dec. 9, 2015

(65) Prior Publication Data
US 2016/0163195 A1   Jun. 9, 2016

Related U.S. Application Data

(60) Provisional application No. 62/089,449, filed on Dec. 9, 2014.

(51) Int. Cl.
*G08G 1/123* (2006.01)
*G01C 21/20* (2006.01)
*G08G 1/127* (2006.01)
*G01S 19/42* (2010.01)

(52) U.S. Cl.
CPC ............... *G08G 1/123* (2013.01); *G01C 21/20* (2013.01); *G08G 1/127* (2013.01); *G01S 19/42* (2013.01)

(58) Field of Classification Search
CPC .. G08G 1/123; G08G 1/0141; G08G 1/0125; G08G 1/0112; G08G 1/127; G01C 21/20; G01C 21/3691; G01C 21/26; G01S 19/42; G01S 5/0294; G06Q 90/00; H04W 4/023; H04W 4/028; H04W 88/005
USPC ......... 340/994, 995.23, 995.19; 705/1.1, 28; 455/456.3, 456.1, 414.1; 701/465, 408, 701/519
See application file for complete search history.

(56) References Cited

U.S. PATENT DOCUMENTS

| 2008/0195428 A1* | 8/2008 | O'Sullivan | G06Q 10/00 705/6 |
| 2009/0312947 A1* | 12/2009 | Brandis, Jr. | G08G 1/123 701/469 |
| 2011/0050463 A1* | 3/2011 | Yu | G01S 5/0027 340/993 |
| 2012/0092194 A1* | 4/2012 | Crucs | G08G 1/123 340/994 |
| 2015/0073702 A1* | 3/2015 | Jouaux | G06Q 90/00 701/465 |

* cited by examiner

*Primary Examiner* — Anh V La
(74) *Attorney, Agent, or Firm* — Christina Chamberlain; Intellectual Property Consulting, LLC

(57) ABSTRACT

An application program interface (API) for communicating with a transportation integration network is provided wherein an application can utilize the API to retrieve, store, and otherwise access or modify transportation location tracking data from disparate data stores and then display the data in a single API, website or computer software program.

20 Claims, 2 Drawing Sheets

TRANSPORTATION LOCATION AND ALERT APPLICATION FOR MOBILE DEVICE

RELATED APPLICATIONS

This application claims priority to U.S. Provisional Application No. 62/089,449 filed Dec. 9, 2014. The entire contents of the above application are hereby incorporated by reference as though fully set forth herein.

FIELD

The present invention relates generally to transportation and communications. More particularly, the present invention relates to systems and methods for providing location information and advance notification for transportation vehicles.

BACKGROUND

When guests are waiting for transportation, such as a bus, to arrive to transfer them to a meeting, convention, venue, etc., the amount of time one perceives they have been waiting is always much longer than the time they have been actually waiting. Part of the reason for this is the anxiety of the uncertainty of the arrival time for the next bus. Meeting planners regularly get complaints that someone has been waiting for 20-30 minutes for a bus when it can be documented after the fact that buses arrived in no longer than 10-minute intervals.

Meeting planners of events such as a conference, meeting, convention, incentive trip, etc., want to be able to know where their VIP's are over the course of an event, including while they are in vehicles provided by the event. This goal is complicated by the fact that drivers are no longer allowed to use their cell phones while in motion, making it harder to learn the location of vehicles. Meeting planners want to know where vehicles are located when guests are arriving at a destination from the departure location, such as arriving at a hotel from the airport, so they can be greeted upon arrival. They also want to know of traffic situations that would delay a passenger or group of passenger's arrival.

For example, a common industry practice is that meeting planners want to greet their VIP's upon their arrival at the hotel from the airport. This has led to an industry practice known as the "10 minute call out". Historically, the driver would call when they were 10 minutes from the hotel, if they remembered to do so. Now that drivers are often not allowed to use their phones when driving, meeting planners are reduced to having the driver call before they leave their departure location, which is not optimal because it significantly increases the window of time in which they might arrive at their destination location. The reason that this is a problem is that it is imperative that the VIP greeting is not missed. However, in order to be sure they don't miss the VIP arrival, meeting planners often end up waiting at the destination for more time than necessary, taking them away from other pressing issues. One alternative to address this problem is to make multiple calls into the transportation providers dispatch office to determine when the vehicle's global positioning service ("GPS") shows it is 10 minutes away.

API stands for Application Programming Interface (API) and it is the language of applications. It's a software-to-software interface that allow for separate parties to talk to each other without any previous user knowledge or intervention. It runs the processes behind the scenes. For example, many online stores use these to allow you to enter credit card information, and then the store uses the API to send the information to a remote application that will verify whether or not the information is correct. API and the adjoining services are invisible to site users and software users. Their jobs run in the background providing a way for applications to work simultaneously.

Meeting planners often use multiple transportation companies when booking transportation for events. This adds a level of complexity when trying to determine where vehicles are located and when passengers will be arriving. While some (certainly not most) transportation providers have the ability to offer meeting planners a link to their company location tracking data, there is a need for method to tie multiple providers together onto one location map via API integration, allowing the meeting planner to view the location of all of their expected passengers in real-time. Rather than logging in to multiple APIs provided by the disparate transportation company data stores, there is a need to log into and view data from disparate transportation company data stores in one convenient and easy to follow format such as through an API, website or computer software program.

BRIEF SUMMARY OF THE INVENTION

The present invention seeks to address these needs by providing a client in charge of a group of passengers taking different transportation companies to a destination a unique log in for their specific group which will allow them to view in one view, real time, where every vehicle on their event is located, regardless of which transportation provider is assigned each vehicle and passenger.

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

An application program interface (API) for communicating with a transportation integration network is provided wherein an application can utilize the API to retrieve, store, and otherwise access or modify transportation location tracking data from disparate data stores and then display the data in a single API, website or computer software program. The API can communicate with the application in an extensible language format, such as extensible markup language (XML). The API can also provide a layer of authentication/authorization of applications and users to access the data.

The transportation location data stored in the system can be, for example, GPS data. The API facilitates access to all of this data for retrieval from disparate data stores, storage in a transportation integration network, retrieval from transportation integration network, and access and display on a central device.

DETAILED DESCRIPTION

The preferred embodiment of the present invention is an application program interface (API) provided to facilitate accessing a transportation integration network that is comprised of disparate data stores, i.e. data from multiple companies' location tracking information. The API can receive and process requests from applications to retrieve, store, modify, or otherwise access data within the transportation integration network and can provide authentication/authorization functionality. The API can receive requests in an extensible data form, such as extensible markup language (XML) and the request may be received over a Hypertext Transfer Protocol (HTTP) connection. The API may operate with numerous devices and applications such to effectively create a central storage and one-stop access for transportation location tracking data with an easy to use API. The location tracking data can be stored and obtained in a non-structured or non-schematized manner.

A second embodiment of the invention is a computer-implemented system, comprising the application program interface (API) described above, a processor; and a computer-readable storage medium storing instructions that, when executed by the processor, cause the processor to implement at least one of the receiver component, the interpreter component, or the transformation component.

Another embodiment of the present invention is a computer-implemented method of interacting with transportation location data from disparate data stores, the computer-implemented method comprising receiving transportation tracking data from a first device or software application (i.e. the data stored in disparate devices or applications); storing the data in a transportation integration network; requesting data from the transportation integration network based on the transportation tracking data record; applying a schema to the transportation tracking data to prepare a result comprising selected parts of the transportation tracking data; and creating a routine to access and provide the selected parts of the transportation tracking data on a central device or application software in response to the request.

Figure 1:
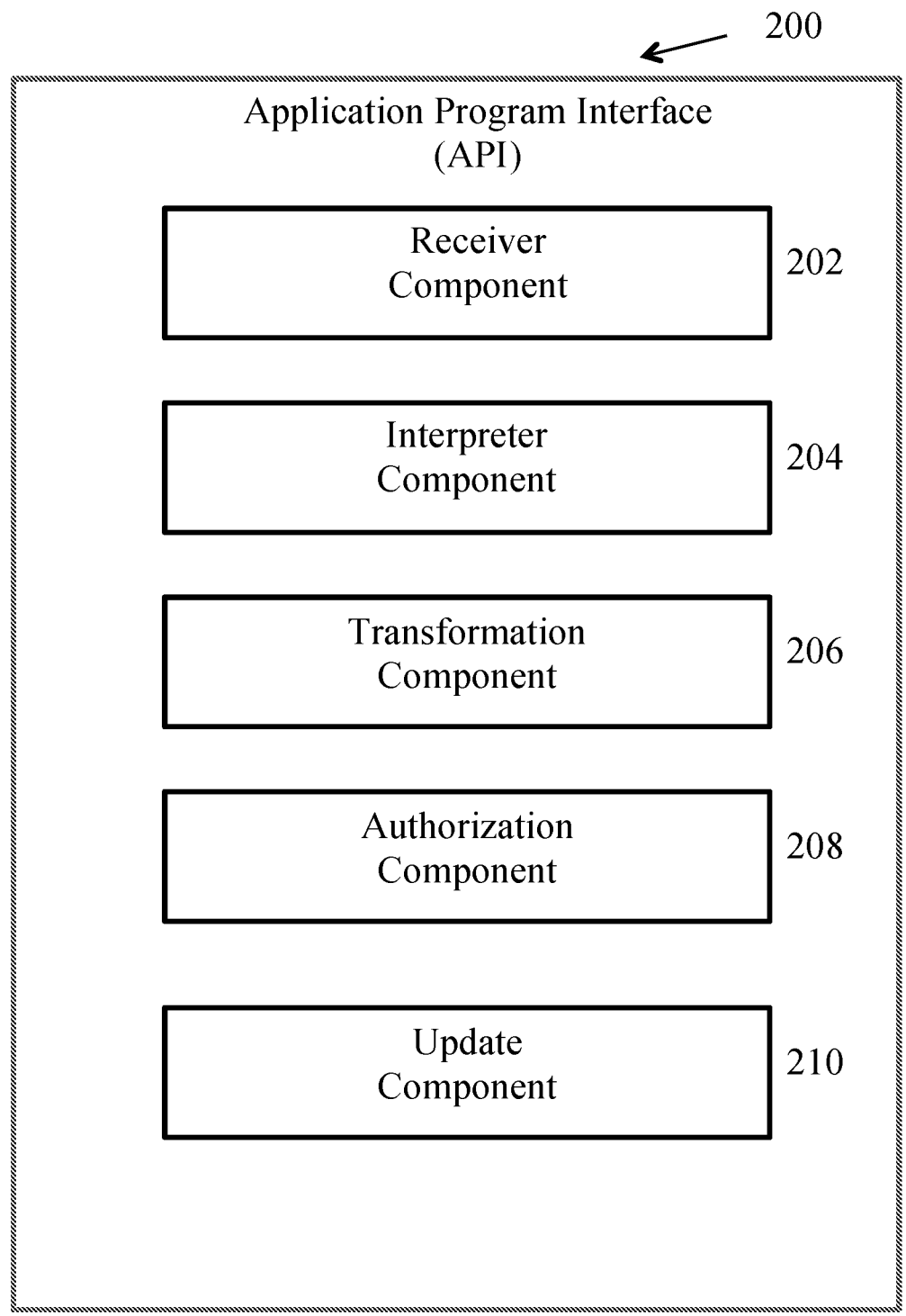
FIG. 1. Illustrates a block diagram of an exemplary API of the present invention.

Now turning to the figures, FIG. 1 an API 200 is shown having various components to facilitate requests to gather, retrieve, store, or otherwise access data. The API 200 can have a receiver component 202 configured to receive requests for transportation location data gathered from a plurality of disparate devices or software applications. The API 200 can have a transformation component 206 configured to compile gathered transportation location data to return to a central device or software application. The API 200 can also comprise an authorization component 208 to apply authorization/authentication rules to the requesting entity to ensure it has sufficient access to make the desired request. An update component 210 may be configured to send transportation location data alert to the central device in response to at least one of an occurrence of an event or a predetermined threshold being exceeded.

In utilizing the API 200, a requesting entity, such as a device, application, or device running an application can initiate a request for data to the API 200, which is picked up by the receiver component 202. The request can be to access and gather transportation location tracking data, for example, such as GPS information, from a plurality of disparate data stores (i.e. data from each transportation company that is stored in separate data stores such as in a website, API or computer software program). The receiver component 202 receives the request and sends it to the interpreter component 204. The interpreter component 204 is configured to process the request for transportation location data and gather at least a subset of requested location data from the transportation integration network, wherein the transportation integration network comprises a plurality of disparate data stores that respectively store location tracking data. The interpreter component 204 can leverage the authorization component 208 to determine if the requesting entity has sufficient privileges to access the requested data for the type of request presented. If access is granted, the interpreter component 204 can access relevant data, such as GPS data. This information can then be passed to the transformation component 206, which compiles gathered transportation location data to return to a central device or software application wherein the compiled data is displayed on the central device or in the software application. The update component 212 is configured to send a transportation location data alert to the central device in response to at least one of an occurrence of an event or a predetermined threshold being exceeded. For example, if transportation tracking data indicates arrival of one of the transportation vehicles at the destination within ten minutes, an alert can be sent to the central device.

Figure 2:
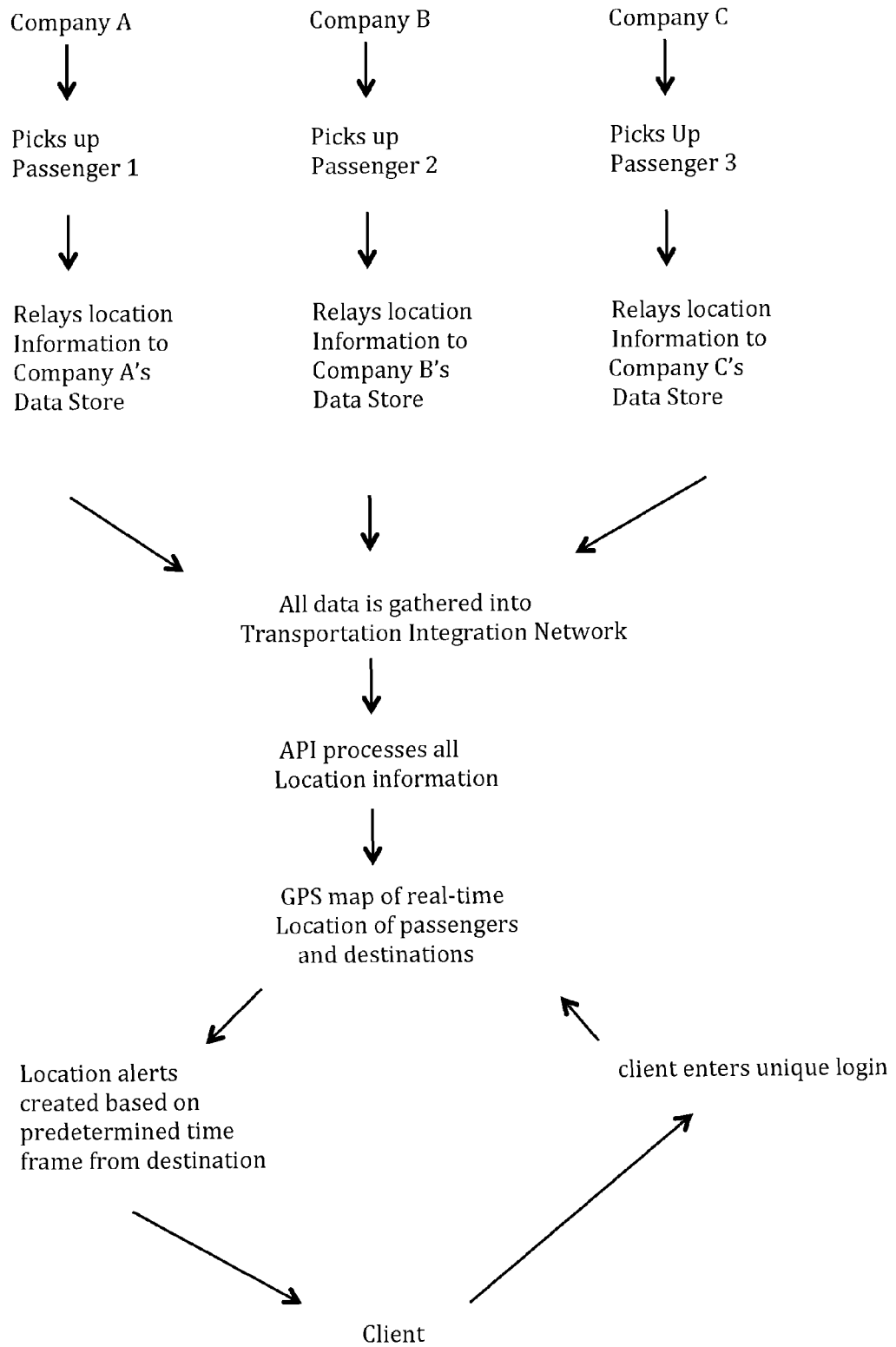
FIG. 2. Illustrates a schematic diagram of an example of the present invention in use.

Turning to FIG. 2, one example of the present invention is illustrated wherein location information and notification alerts about approaching transportation from multiple companies, as Company A, B and C, is provided. The API has a receiver component configured to receive requests for transportation location data. The data is from a plurality of disparate devices or software applications from company A, B and C. When a passenger is picked up, location information, such as GPS data, is relayed to each of the company's software applications to form a transportation integration network of disparate data stores to store location tracking data. The receiver component receives a request for location information of one of the passengers or transportation vehicles and an interpreter component is configured to process the request for transportation location data and gathers at least a subset of requested location data from the transportation integration network. For example, the meeting planner wants to know the location of passenger 1 in one of Company A's vehicles. The request is made to the receiver component for passenger 1 location information. The interpreter component processes the request and gathers transportation location data, such as GPS data, from Company A's data store for passenger 1. The data store may be accessed through an API, web application, database or software program. A second request is made to the receiver component for the location of a passenger 2 in one of Company B's vehicles. The interpreter component processes the request and gathers transportation location data, such as GPS data, from Company B's data store for passenger 2. The data store may be accessed through an API, web application, database or software program. A transformation component is configured to compile gathered transportation location data from all disparate data stores (in this example Company A and B's API, web application, database or software program) and returns the data to a central device or software application to create a GPS map of the transportation vehicles from Company A and B that carry the passengers land 2.

The transportation vehicle may be, for example, a bus, a car, a truck, a train, a taxicab, a trolley, a boat or other suitable means of transportation. The communication network used to transmit all data may include at least one of, for example, a cellular telephone network, the Internet, a satellite network or other suitable communication networks.

The invention further includes the generation of a unique user login such that a client may view the generated GPS map and see the location of all passengers in all vehicles in their party.

The invention further includes sending a transportation notification to a client based on a predetermined time frame for each vehicle from its intended destination. The transportation notification may be in the form of an email message, a text message, or a voice message. For example, when a passenger from Company A is ten minutes from its destination, a notification to the meeting planner is generated through the API to the meeting planner's device or as a voice mail, text message or email message to the contact information for the meeting planner.

For the purposes of promoting an understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the method (and components of the individual operating components of the method) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections might be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A non-transitory application program interface (API) for transportation location data tracking, comprising:
   i. a receiver component configured to receive requests for transportation location data for a plurality of vehicles at a local database server;
   ii. a connection component configured to establish connectivity of the local database server with a plurality of foreign databases, wherein the transportation location data of a first vehicle selected from the plurality of vehicles is located in a first foreign database of the plurality of foreign databases and the transportation location data of a second vehicle selected from the plurality of vehicles is located in a second foreign database or the first foreign database of the plurality of foreign databases;
   iii. a transmission component configured to send a request to the foreign databases for vehicle transportation location data contained within the foreign databases of the first and second vehicles, respectively;
   iv. an interpreter component configured to process at least a subset of requested location data from the first and second foreign databases in a unified format; and
   v. a transformation component configured to compile and display gathered vehicle transportation location data in the unified format on a central device or software application.

2. The API of claim 1, wherein the transportation location data that is compiled is GPS data.

3. The API of claim 2, wherein the compiled GPS data is displayed on the central device or software application.

4. The API of claim 1, wherein the transformation component is further configured to display transportation location data in the unified format on the central device or software application based on an occurrence of an event or a predetermined threshold being exceeded.

5. The API of claim 4, wherein the API further comprises an update component configured to send a transportation location data alert to the central device in response to at least one of the occurrence of the event or the predetermined threshold being exceeded.

6. The API of claim 5, wherein the API further comprises an authorization component configured to determine whether a user operating the central device has sufficient credentials for the transportation location data access specified in the request.

7. The API of claim 1, wherein the request is received in extensible markup language (XML) format.

8. The API of claim 5, wherein the request is received over a Hypertext Transfer Protocol (HTTP) connection.

9. A computer-implemented system, comprising:
   a. A non-transitory application program interface (API), comprising:
      i. a receiver component configured to receive requests for transportation location data for a plurality of vehicles at a local database server;
      ii. a connection component configured to establish connectivity of the local database server with a plurality of foreign databases, wherein the transportation location data of a first vehicle selected from the plurality of vehicles is located in a first foreign database of the plurality of foreign databases and the transportation location data of a second vehicle selected from the plurality of vehicles is located in a second foreign database or the first foreign database of the plurality of foreign databases;
      iii. a transmission component configured to send a request to the foreign databases for vehicle transportation location data contained within the foreign databases of the first and second vehicles, respectively;
      iv. an interpreter component configured to gather at least a subset of requested location data from the foreign databases to form a transportation integration network; and
      v. a transformation component configured to compile and display gathered transportation location data in a unified format on a central device or software application,
   b. a processor; and
   c. a non-transitory computer-readable storage medium storing instructions that, when executed by the processor, cause the processor to implement at least one of the receiver component, the connection component, the transmission component, the interpreter component, or the transformation component.

10. The computer-implemented system of claim 9, wherein the transportation location data that is compiled by the API is GPS data.

11. The computer-implemented system of claim 10, wherein the compiled GPS data is displayed on the central device or software application.

12. The computer-implemented system of claim 9, wherein the transformation component is further configured to display transportation location data in unified format on the central device or software application based on an occurrence of an event or a predetermined threshold being exceeded.

13. The computer-implemented system of claim 12, wherein the API further comprises an update component configured to send transportation location data alert to the central device in response to at least one of the occurrence of the event or the predetermined threshold being exceeded.

14. The computer-implemented system of claim 13, wherein the API further comprises an authorization component configured to determine whether a user operating the central device has sufficient credentials for the transportation location data access specified in the request.

15. The computer-implemented system of claim 9, wherein the request is received in extensible markup language (XML) format.

16. The computer-implemented system of claim 15, wherein the request is received over a Hypertext Transfer Protocol (HTTP) connection.

17. A computer-implemented method of interacting with transportation location data, the computer-implemented method comprising:
   a. receiving a request for transportation tracking data of a plurality of vehicles at a local database server from a first device or software application by a non-transitory receiver component;
   b. establishing connectivity of the local database server with a plurality of foreign databases, wherein the transportation location data of a first vehicle selected from the plurality of vehicles is located in a first foreign database of the plurality of foreign databases and the transportation location data of a second vehicle selected from the plurality of vehicles is located in a second foreign database of the plurality of foreign databases;
   c. sending a request to the first and second foreign databases for vehicle transportation location data contained within the foreign databases of the first and second vehicles, respectively;
   d. gathering at least a subset of requested location data from the foreign databases in a unified format;
   e. storing the transportation location data in the unified format;
   f. applying a schema to the unified format data to prepare a result comprising selected parts of the transportation location data; and
   g. creating a routine to access and provide the selected parts of the unified format data on a central device or application software in response to the request.

18. The computer-implemented method of claim 17, wherein the transportation location data is GPS data.

19. The computer-implemented method of claim 17, further comprising sending the result to the central device or software application based, at least, in part, on the request.

20. The computer-implemented method of claim 17, further comprising receiving a disparate request for transportation location data from a second device or software application, wherein the second device or software application operates on a different architecture than the first device or software application.

* * * * *